United States Patent [19]

Busse

[11] 4,409,045
[45] Oct. 11, 1983

[54] METHOD AND APPARATUS FOR SEALING THE SIDEWALL AND BOTTOM SEAM PORTIONS OF TWO-PIECE CONTAINERS DURING MANUFACTURE THEREOF

[75] Inventor: Charles E. Busse, Jarrettsville, Md.

[73] Assignee: Maryland Cup Corporation, Owings Mills, Md.

[21] Appl. No.: 399,980

[22] Filed: Jul. 20, 1982

[51] Int. Cl.³ .................. B29C 27/00; B65B 7/00
[52] U.S. Cl. .................. 156/69; 156/446;
156/499; 156/567; 53/563; 493/102; 493/106; 493/107; 493/158
[58] Field of Search .............. 156/69, 215, 446, 499, 156/556, 567; 493/102, 105, 106, 107, 108, 109, 158, 163, 164; 53/563

[56] References Cited

U.S. PATENT DOCUMENTS

| | | | |
|---|---|---|---|
| 2,602,383 | 7/1952 | Barbieri | 493/106 |
| 3,439,590 | 4/1969 | Rosenberg et al. | 156/499 |
| 3,547,012 | 12/1970 | Amberg et al. | 156/69 |
| 3,846,207 | 11/1974 | MacDaniel et al. | 156/499 |
| 4,238,267 | 12/1980 | Konstantin | 156/499 |

Primary Examiner—Edward C. Kimlin
Assistant Examiner—Timothy W. Heitbrink
Attorney, Agent, or Firm—Birch, Stewart, Kolasch and Birch

[57] ABSTRACT

Method and apparatus for fabricating and seaming two-piece containers such as frustoconical cups and the like are provided which include a two-piece mandrel having retractable tip or nose piece which is coaxial in its relation to the main body of the mandrel in its extended position and retracts to an offset position. The retraction/extension path is configured to constrain the surface of the tip or nose piece to impart a progressive sealing pressure to a portion of the container side seam against the reaction surface of a seam clamp. The tip also has vacuum porting for holding a bottom blank during the container forming process and acts to seal the bottom blank in the container bottom curl and in the case of effecting heat sealed seams in the container, to position the bottom blank so as to preclude heat damage to the bottom wet line area of the container.

29 Claims, 12 Drawing Figures

METHOD AND APPARATUS FOR SEALING THE SIDEWALL AND BOTTOM SEAM PORTIONS OF TWO-PIECE CONTAINERS DURING MANUFACTURE THEREOF

FIELD OF THE INVENTION

This invention relates to an improved method and mandrel structure for sealing the side and bottom seams of two-piece containers and more particularly, to such a method and mandrel apparatus for two-piece cups wherein the said cups are manufactured from paperboard, thermoplastic coated paperboard and thermoplastic material either in the foamed or unfoamed state as the case may be.

BACKGROUND OF THE INVENTION

In the prior art, either when heat sealing the side and bottom seams of a frustoconical two-piece cup, for example, or when gluing these same seam areas in such a container, a mandrel having a movable tip has been utilized in the fabricating apparatus to selectively apply pressure to the seams and a point of reference to the bottom blank during the cup forming process to maintain it in place for the final sealing pressure to be applied thereto. The mandrels either have a solid plunger which reciprocates in and out of a hollow tip or have a solid extensible tip portion on the mandrel, either system being disadvantageous. In the case of the hollow tipped mandrels, such hollow tips or nose pieces are very vulnerable to damage and are expensive to manufacture. Furthermore, they are subject to discontinuities in the edges thereof which tend to cut through the thermoplastic coatings on the paperboard or otherwise disfigure or cut the material from which the two-piece cup is being made thereby causing areas of weakness and the potential for leaks in the side seam.

The solid mandrel or plunger types which utilize extendable tip portions create a stepped area (discontinuity) in the side seam just above the bottom wall of the cup or container which must be ironed out or compensated for such as by a stepped configuration in the conventional side seam clamps which are utilized to effectuate the side seam seal and therefore, this discontinuity is another source of quality control problems such as leaks and weakness.

It is therefore an object of the present invention to provide new and novel mandrel structures for sealing the side and bottom seams of conventional two-piece cups and the like by leak sealing or gluing.

Still another object of the present invention is to provide new and novel methods and apparatus for heat sealing and gluing the side and bottom seams of a two-piece conventional cup or the like.

Yet another object of the present invention is to provide a new and novel method and apparatus for heat sealing thermoplastic coated two-piece paperboard containers in the side and bottom seam areas.

These and other objects of the present invention will become more fully apparent with reference to the following specification and drawings which relate to several preferred embodiments thereof.

SUMMARY OF THE INVENTION

While the present invention is applicable to thermoplastic coated paperboard as well as thermoplastic material in both a foamed and non-foamed variety, the invention as directed to heat sealing will be described in connection with thermoplastic coated paperboard coated either on one or both sides thereof and as directed to gluing in connection with paperboard.

A first embodiment of the present invention is directed to an improved method and mandrel apparatus for sealing the side and bottom seams of two-piece cups by the application of heat and pressure. The application of heat is such as to soften the thermoplastic coating on the paperboard components of a container so that a bond will be created when the heated areas of the cup blank, both the sidewall and bottom blanks, are brought into pressurized contact. The invention described herein may be applied to containers of a square, rectangular, eliptical or any other desired geometric shape having tapered or straight sidewalls. The preferred embodiment of the present invention will be described in conjunction with a frustoconical shaped container.

The mandrel structure of the present invention comprises a main frustoconical forming section with an extendable tip section (nose piece) also of a frustoconical configuration but having a lesser outer diameter than the smallest end of the main forming section of the mandrel to which it is affixed. The solid tip section (nose piece) on the mandrel is mounted so that in its most extended position the center thereof is coincident with the center of the main forming section or forming cone of the mandrel and so that in its retracted position against the small end of the forming cone, the tip section is offset such that only one peripheral side portion thereof provides a continuous extension of the sidewall portion of the forming cone in that region adapted to engage immediately beneath the side seam being formed on the mandrel.

The mandrel structure is used in conjunction with a forced air bottom heater having a fixed heater element with a reciprocating diffuser head movable in and out of proximity with the bottom curl of the container and which is further provided with a linkage for retraction of the diffuser head away from its associated work station in the event of breakdowns or other emergency situations.

A further feature of the mandrel is that the solid tip section in its forward and retracting motions follows exactly the taper angle of the sidewall of the cup as measured from the central axis of the main forming section (forming cone) of the mandrel such that sealing pressure is applied throughout the entire sideseam from the bottom wet line of the cup to the top curl thereof.

In another embodiment of the present invention wherein the side and bottom seams of the container are to be glued, the same mandrel structure is utilized to effectuate a uniform pressure in the side seam and bottom seam areas to produce a uniform glue bond.

DETAILED DESCRIPTION OF THE DRAWINGS

Figure 1:
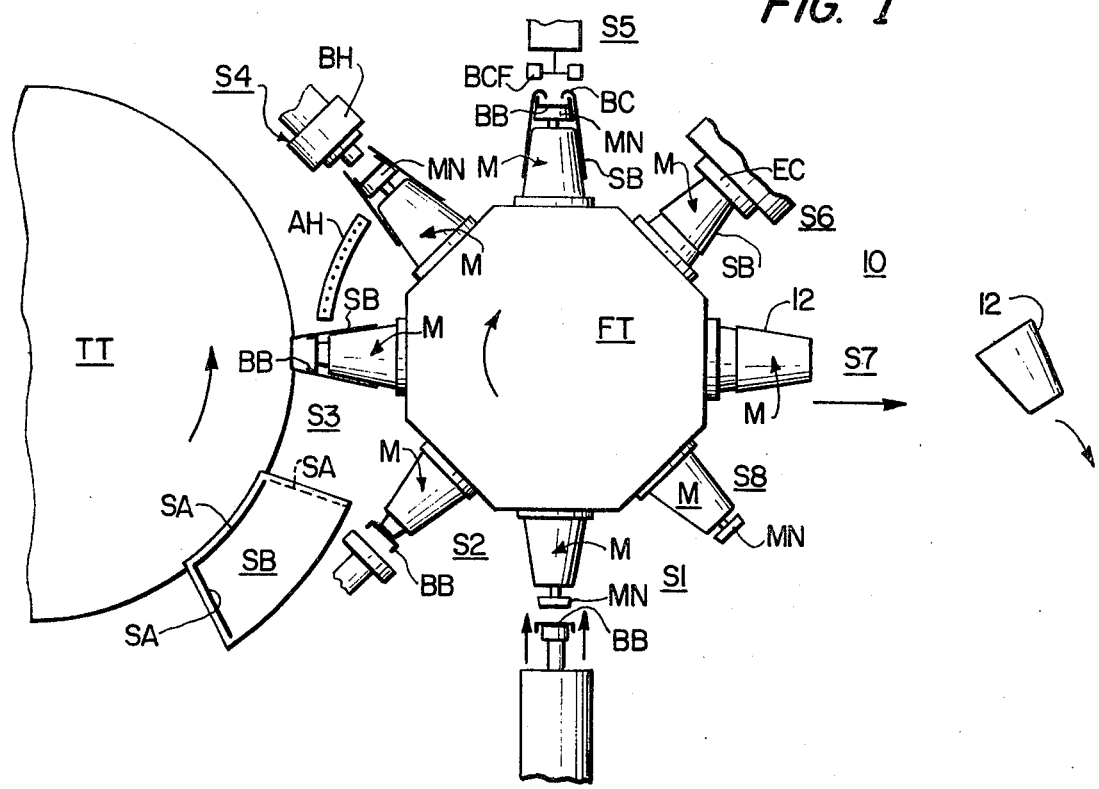
FIG. 1 is a schematic illustration of a cup making machine having a turret which carries forming mandrels from work station to work station to complete the assembly process.

Referring in detail to the drawings and with particular reference to FIG. 1, the manufacture of a two-piece frustoconical cup is commenced by means of a forming apparatus 10 illustrated as comprising a forming turret FT with a plurality of radially disposed forming mandrels M extending therefrom in a symmetrical array such that each of the mandrels M can be indexed by the forming turret FT to peripherally disposed work stations. The forming mandrels M include extendable tip sections MN which are active in the cup forming and seam sealing process.

The work stations are designated as S1 through S8 in a clockwise sequence in FIG. 1 commencing at the six o'clock position for the first work station S1.

At the first work station S1 a cup bottom blank BB is formed and transferred into juxtaposition with the extended tip section MN of the forming mandrel M where it is held by suitable vacuum as will be more fully described hereinafter. The mandrel with the bottom blank BB affixed thereto is indexed next to the second work station S2 at which point the bottom blank BB is re-formed in the desired shape for cooperating with a sidewall blank SB which will be placed upon the mandrel M at the third working station S3 by means of a transfer turret TT as shown in FIG. 1.

Each sidewall blank SB includes a heat sealing pattern or seaming area SA (or glue sealing pattern as the case may be) placed thereon by any suitable conventional means immediately prior to delivering the sidewall blank SB to the third work station S3 at which point it is wrapped about the forming mandrel M, the mandrel tip section MN and the formed bottom blank BB on the mandrel nose piece.

As the forming turret FT indexes from the first work station S1 to the second work station S2 the mandrel tip section MN retracts to its inner position against the face of the main forming section of the forming mandrel M following a line of movement which matches identically the taper angle of the cup sidewall as measured from the center axis of the forming section of the mandrel M. The retraction of the tip section MN has the effect of making the center of the tip section MN and the formed bottom blank BBV eccentric to the center of the forming section of the mandrel M in such a way that the forming section face and the rear face of the tip section MN have a common point of tangency along the vertical axis of the forming section of the mandrel M as will hereinafter be more fully described.

As the forming turret FT with its multiplicity of forming mandrels indexes to the third work station S3, the forming section and retracted tip section MN come into alignment with the sidewall SB which has its seaming areas SA either at the proper temperature for sealing or with suitable glue applied thereto. The mechanisms for heating the seam areas as well as those for applying glue thereto prior to the placement of sidewall blanks SB on the forming sections of the mandrels M are well known in the art. Also known in the art are holding mechanisms such that as the sidewall blank SB is aligned at the third work station S3 with the forming mandrel M and tip section MN, the said sidewall blank SB is folded or wrapped around the forming section of the mandrel M and the tip section MN and a seam clamp, to be hereinafter more fully described, is applied to the side seam to provide the necessary pressure for proper bonding of the lapped sidewall seam.

In the heat sealing embodiment of the present invention as the turret FT indexes from the third work station S3 to the fourth work station S4, the tip section MN and the formed bottom blank BB thereon are cammed forward (outward from the outer most face of the forming section of the mandrel M) to a position where the leading edge of the formed bottom blank BB is a short distance (on the order of point 0.050 inches) beyond the theoretical wet bottom line WBL (FIGS. 5A and 6A) of the ultimate container to be produced by the forming process.

In the heat sealing embodiment of the present invention a bottom heater directing heated air uniformly against the circumference of the formed bottom blank BB and adjacent seam area SA of the sidewall blank SB is positioned adjacent the outer most reach of the sidewall blank SB on the mandrel M. Furthermore, as the mandrel M with the sidewall blank SB and the bottom blank BB thereon proceeds from the third work station S3 to the fourth work station S4, additional heat may be applied to the unpressurized area of the side seam between the extended mandrel tip section MN and the forming cone portion of the mandrel M by means of an auxiliary side seam heater positioned in an arcuate path corresponding to the locus of the unpressurized area of the side seam as it travels from the third work station S3 to the fourth work station S4. Accordingly, the auxiliary side seam heater AH is arcuate in configuration as shown in FIG. 1.

The extension of the leading edge of the bottom blank BB beyond the theoretical wet bottom line WBL of the ultimate finished container serves to protect the wet bottom seam heater BH to thereby preclude weakening or other destructive effects on the thermoplastic coating on the sidewall SB of the container, ultimately reducing the ability of the finished container to resist penetration by liquids such as hot coffee and the like. The structure and details of the bottom heater assembly BH will be more fully described hereinafter.

With the bottom seam area heated at the fourth work station S4, the forming turret FT indexes to the fifth work station S5 during which time the tip section MN is moved outward to its maximum extended position together with the formed bottom blank BB at which position the formed bottom blank BB is to be bonded to the sidewall SB. As the tip section MN moves outward it is in juxtaposition with the interior of the lapped side seam and presses the lapped side seam against the seam clamp SC (see FIG. 5A and FIG. 6A, seam clamps SC). This action of tip section MN against the side seam clamp provides the necessary pressure to effect bonding of the lower and previously unpressurized portion of the side seam and in the fullest extended position the tip section MN is juxtaposed with the entire bottom seam area.

At the fifth work station S5 the extension of the sidewall SB beyond the formed skirt of the bottom blank BB is turned inward mechanically by a suitable rimming device known in the art. Subsequently, the forming turret FT is indexed to the sixth work station S6 where the bottom seal is completed by a mechanical pressing wheel PW to be hereinafter more fully described in conjunction with FIGS. 8 and 9.

After the sixth work station, the turret FT is rotated once more to index the finished container 12 on the mandrel M to the seventh work station S7 from which position the container 12 is ejected as schematically indicated in FIG. 1, by any suitable means known in the art, to impart thereto, for example, a top curl configuration or to transmit the said finished container 12 to a packaging apparatus.

Figure 2:
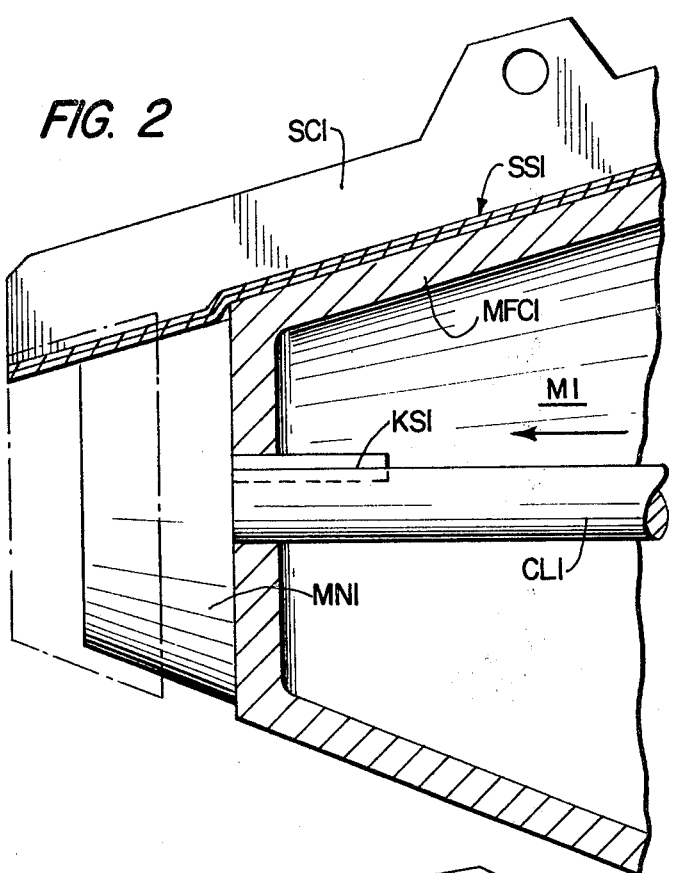
FIG. 2 illustrates a solid tip section forming mandrel typical of the prior art.
Figure 3:
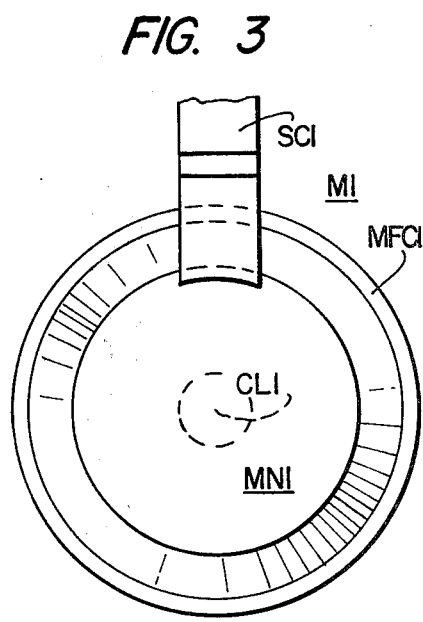
FIG. 3 is an end view of the forming mandrel and seam clamp structure of FIG. 2.
Figure 4:
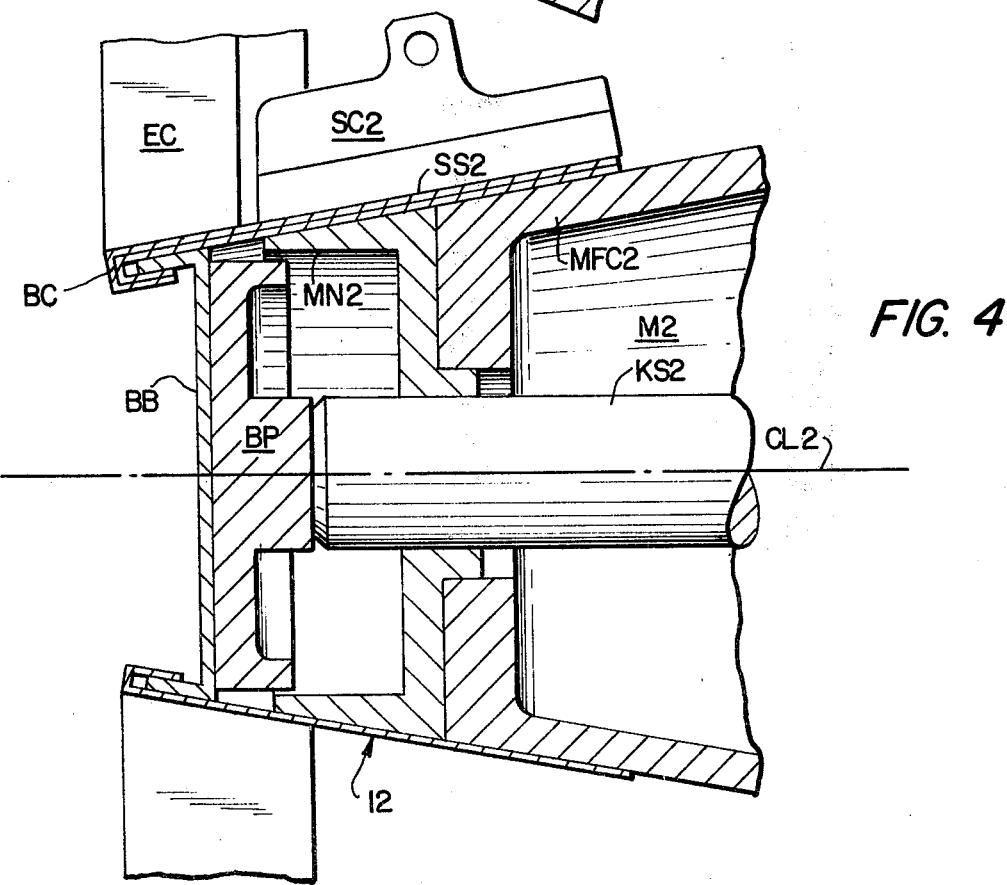
FIG. 4 is a cross-sectional illutration of a hollow nosed forming mandrel of the prior art.

With the foregoing environment and general method of manufacture established, reference is now made to FIGS. 2, 3 and 4 to illustrate prior art forming mandrels and tip sections therefore pursuant to a better understanding of the present invention.

Referring to FIGS. 2 and 3, one form of container forming mandrel M1 in the prior art includes a forming cone MFC1 of a frustoconical configuration having a solid tip section MN1 of lesser diameter mounted for reciprocation along a central axis CL1 of the mandrel M1 on a suitable keyed shaft KS1. A seam clamp SC1 cooperates with both the forming cone MFC1 and the solid tip section MN1 for the purpose of creating pressure against the lapped side seam SS1 of a cup being formed on the mandrel.

The solid tip section MN1 is extendable from the solid line position in juxtaposition with the face of the forming cone MFC1 to the dotted line position illustrated in FIG. 2. The solid tip section MN1 is of lesser diameter than the face of the forming cone MFC1 and is always concentric therewith such that a stepped area is created in the sidewall seam SS1 of a cup being formed on the mandrel. The stepped area is illustrated by the legend STEP and the arrows in FIG. 2 wherein the side seam SS1 is schematically illustrated.

Referring next to FIG. 4, a forming mandrel M2 having a forming cone MFC2 is illustrated as including a hollow tip section MN2 within which a bottom ejector plunger is telescopically mounted on a suitable shaft KS2 for extension toward and away from the forming cone MFC2 on a center line CL2 of the forming mandrel M2. This particular mandrel configuration utilizes an expander clamp EC adjacent the bottom curl BC of a container 12 below the side seam clamp SC2 in order that the bottom blank BB may be properly seated in the bottom curl BC by action of the bottom ejector plunger BP.

Both of the foregoing prior art mandrels M1 and M2 of FIGS. 2 and 4, respectively, have coaxial actuation of the tip section MN1 and the bottom plunger BP within the tip section MN2 as a common feature. The mandrel structure M of the present invention, differs materially from the prior art in that the tip section MN thereof is offset from the center line CL of the mandrel M in its retracted position and is coaxial (symmetrically disposed) with the face forming cone MFC in its fully extended position.

With reference to FIGS. 5A, 5B, 6A and 6B, the forming mandrel M of the present invention and its function in the container manufacturing process will now be described.

Figures 5A, 5B:
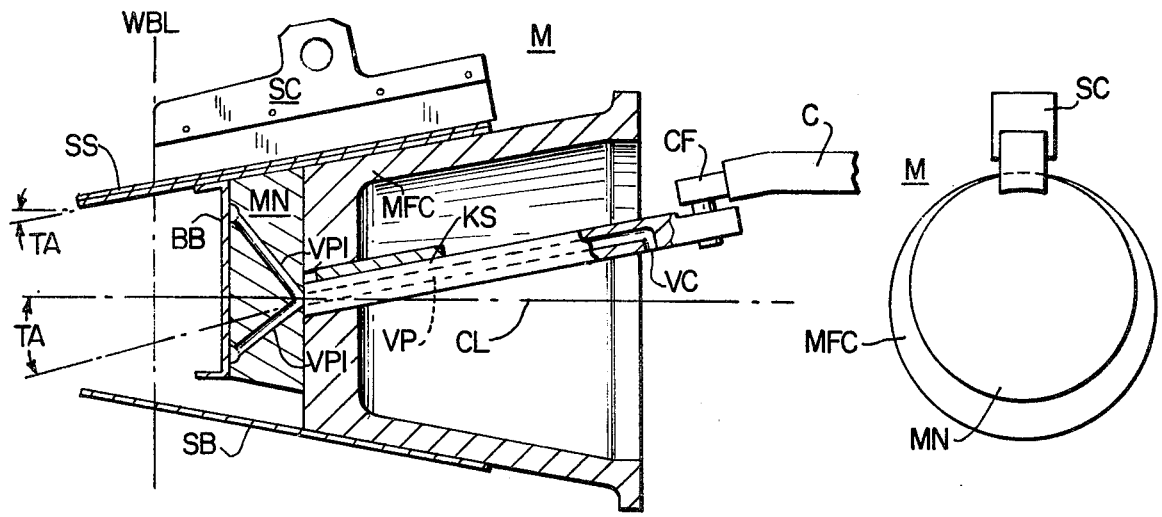
FIG. 5A is a cross-section of the forming mandrel of the present invention with the tip section thereof in the retracted configuration.
FIG. 5B is an end view of the configuration of FIG. 5A.
Figures 6A, 6B:
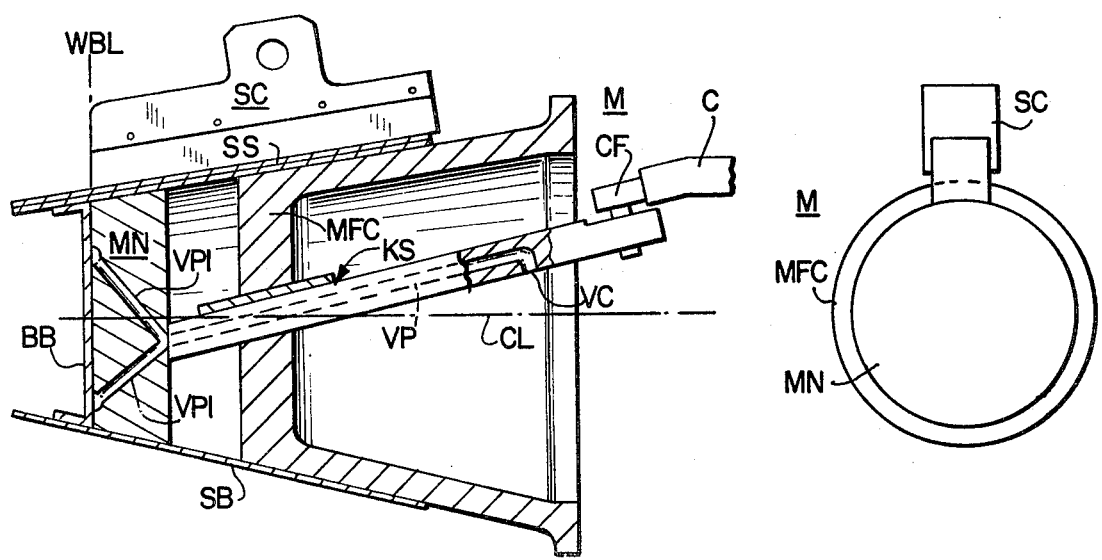
FIG. 6A is a cross-section of the forming mandrel of the present invention with the tip section thereof in the fully extended position.
FIG. 6B is an end view of the configuration of FIG. 6A.

In FIG. 5A, the mandrel M is illustrated with the tip section MN juxtaposed with the mandrel forming cone (forming section) MFC by action of a keyed shaft KS being in its retracted position to which it is biased by an ejector cam C and a cam follower CF on the innermost end of the shaft KS. This cam is schematically shown and can either be a slot cam in a disc to drive the shaft KS in both directions of reciprocation or the shaft KS can be suitably biased to the retracted position and forced toward its outermost position, the latter position being illustrated in FIG. 6A.

As shown, the shaft KS is offset from the center line CL of the mandrel M and is at such an angle that it is always parallel to the taper angle TA of the sidewall SB of the container being manufactured, which taper angle is identical to that of the peripheral surface of the mandrel forming cone MFC and the mandrel tip section MN as referenced to the latter's own center line. As illustrated, this continuity of taper angles between the various components involved produces an unbroken clamping surface beneath the seam clamp SC along the side seam SS of the sidewall SB of the container being formed. Subsequent reference to the fourth work station S4, the bottom heater BH is illustrated as including an air diffuser AD which impinges heated air in a conical configuration about the interior of the sidewall SB of the container being formed on the mandrel M at a point immediately adjacent to the downturned skirt portion BS on the bottom blank BB preparatory to forming a bottom curl BC such as that illustrated in the prior art embodiment of FIG. 4.

Figure 7:
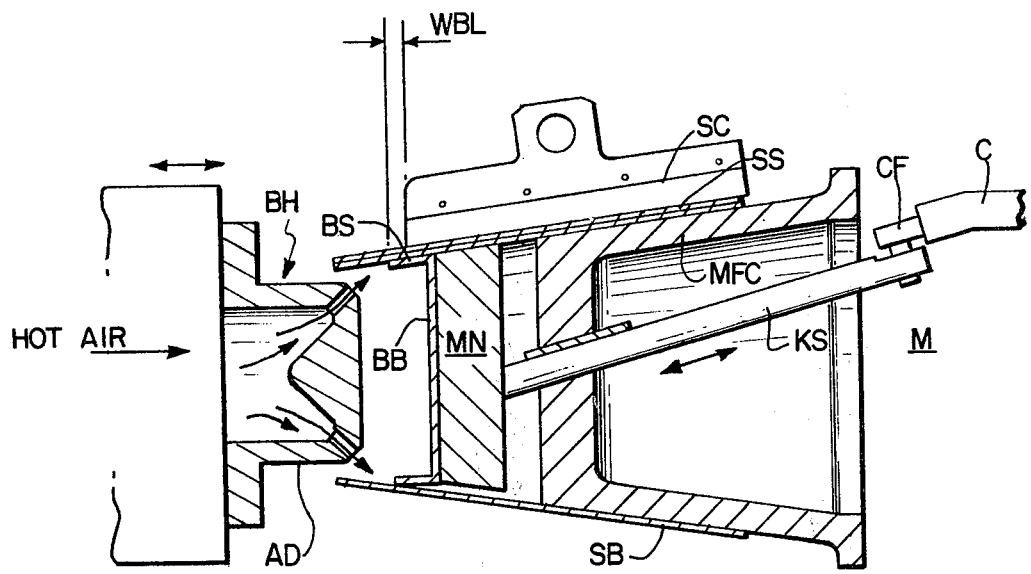
FIG. 7 is a cross-section illustrating the application of heated air to the bottom of a cup being formed on the forming mandrel of the present invention with the nose piece thereof in its fully extended configuration.

As further noted from the configuration illustrated in FIG. 7, the tip section MN of the mandrel M is intermediate its fully retracted and fully extended positions since the bottom blank BB has not been forced downward in the frustoconical sidewall SB to a position corresponding to the wet bottom line WBL in the sidewall SB. Once the thermoplastic coating or surface of the interior of the sidewall SB has been softened sufficiently for effectuating a heat seal by the air diffuser AD on the bottom heater BH, the forming turret FT of FIG. 1 indexes the mandrel configuration illustrated in FIG. 7 to the fifth work station S5 at which the bottom curl BC is started by a suitable bottom curl forming tool BCF.

Figures 8, 9:
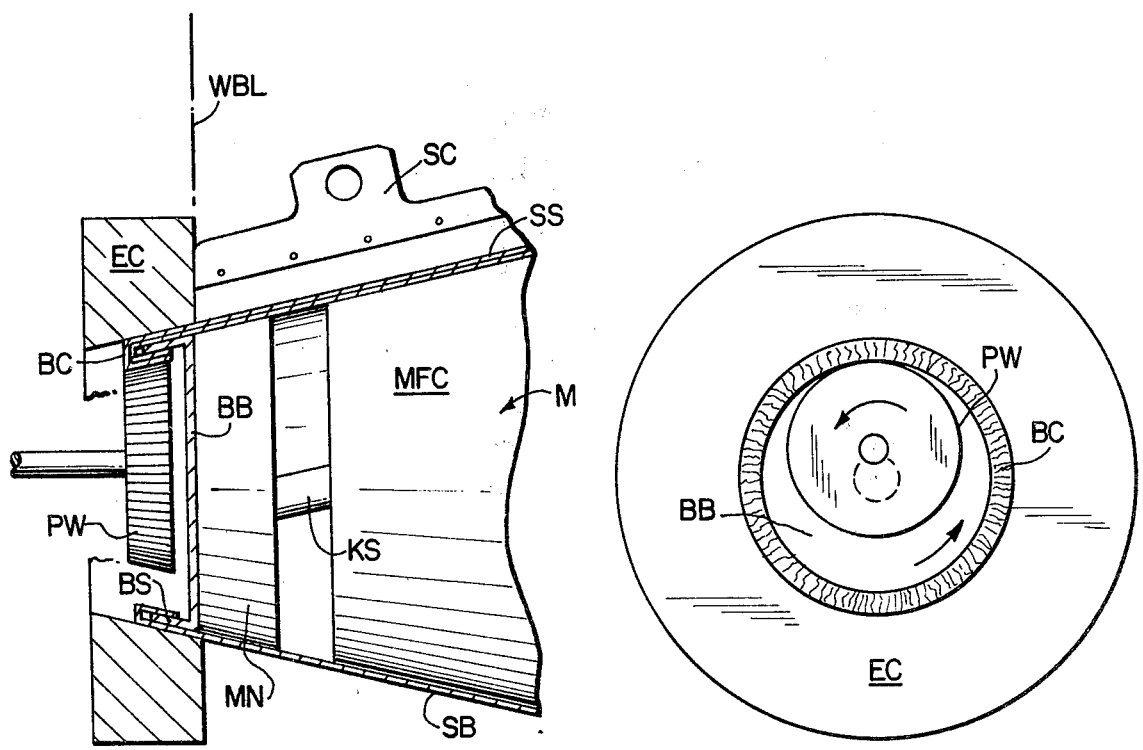
FIG. 8 is a cross-section of the forming mandrel of the present invention together with a bottom seam sealing wheel structure.
FIG. 9 is an end view of the bottom seam forming configuration of FIG. 8.

Thereafter, the mandrel with the partially formed bottom curl BC and the tip section MN in an intermediate position is indexed to the sixth work station S6 where an expander clamp EC (as illustrated in FIGS. 8 and 9) is utilized to seal the bottom curl. At this station the tip section MN has been moved to its fully extended position to force the bottom blank BB to index on the wet bottom line WBL of the sidewall SB and the dependent skirt BS to enter fully and interlock with the bottom curl BC for purposes of forming the bottom curl seal against the internal surface of the expander clamp EC. This bottom curl seal is accomplished by means of a planet type knurled wheel PW which rolls around the internal portion of the bottom curl BC acting against the expander clamp EC to compress the heat softened surface of the sidewall SB internally of the bottom curl BC into sealing engagement with the dependent skirt BS of the bottom blank BB to complete the seam sealing process in the manufacture of the containers 12. These containers, in their fully heat sealed and seamed condition are discharged at the seventh work station S7 either to a packaging device or to a top curl forming device, not shown, as desired.

Figure 10:
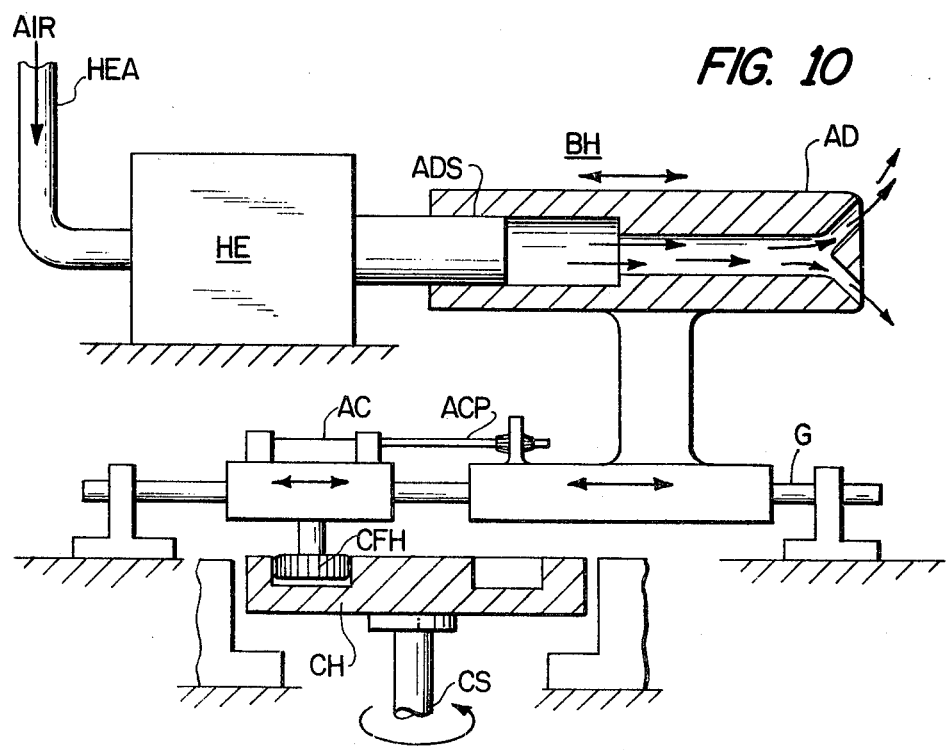
FIG. 10 is a schematic illustration of the hot air heating and diffusing system of the present invention.

Referring now to FIG. 10, the bottom heater BH is shown as including the air diffuser AD which is mounted for reciprocation on a suitable guide assembly G and which includes as a normally rigid link thereof an air cylinder AC having a normally fully extended piston rod ACP which spaces the diffuser head AD a fixed distance from a cam follower CFH and diffuser actuating cam CH, the latter being synchronized by a suitable cam shaft CS with the rotation of the forming turret FT such that the diffuser head AD is moved in and out of proximity with the bottom curl portion of a cup being processed at the fourth work station S4.

The air cylinder AC, while normally in its fully extended condition to impart a fixed length to the extended piston rod ACP, is adapted to be actuated to a retracted position of the piston rod ACP whereby the diffuser head AD is precluded from reaching into immediate proximity with the end of a cup sidewall SB and bottom blank BB at the fourth work station S4 in the event of a malfunction of the machine or equipment to preclude the unnecessary application of heat and the attendant danger of combustion from occurring at that work station.

The diffuser head AD of the bottom heater BH is illustrated as being provided with a sliding coupling ADS with the outlet of a heater element HE which ingests air to the input HEA thereof to heat it and transmit it through the sliding coupling ADS to the air diffuser head AD. In this manner, the heater element HE per se is not subjected to the jarring and reciprocations of the equipment, thereby enhancing its reliability and useful life.

The foregoing method and apparatus is applicable to a glued seam container fabrication by the simple removal or deactivation of the various heating apparatus shown in and described in connection with FIGS. 1 and 10.

The seam areas SA are defined by areas of glue applied by conventional means known in the art and the forming mandrels M, including the retractable tip sections MN, perform the substantially identical functions with respect to forming and pressing the side seams SS and positioning the skirts BS of the bottom blanks BB in the bottom curls BC of the glued containers as in the manufacture of the heat sealed containers 12.

Thus, it is readily seen that the foregoing invention provides a versatile and effective method and apparatus for manufacturing two-piece seamed containers from a wide variety of materials.

It should be understood that the present invention may be modified as would occur to one of ordinary skill in the art without departing from the spirit and scope of the present invention.

What is claimed:

1. Mandrel means for supporting bottom blank and sidewalls portions of a two-piece container during fabrication thereof comprising:

forming section means having a peripheral surface shaped to conform to the ultimate sidewall configuration of a said container and including a side seaming area extending longitudinally of said peripheral surface;

tip means mounted for selective movement toward and away from said forming section means and having a peripheral surface shaped to conform to the ultimate bottom blank and sidewall configuration of the bottom end of a said container;

said tip means in its closest position to said forming section means having a portion of its peripheral surface coincident with and acting as an extension of said side seaming area and in its most extended position having its peripheral surface symmetrically disposed with respect to said forming section means and conformally disposed with respect to the ultimate shape and location of the bottom most portion of a said container to be fabricated on said mandrel means.

2. The mandrel means of claim 1, wherein said tip means further includes vacuum applying means for retaining a bottom blank thereon.

3. The mandrel means of claim 1, wherein said forming section means and said tip means are frustoconical in configuration and coaxially disposed in said most extended position of said tip means.

4. The mandrel means of claim 3, wherein said tip means further includes vacuum applying means for retaining a bottom blank thereon.

5. The mandrel means of either claim 1, 2, 3 or 4 wherein said forming section means is fixed relative to said tip means; and wherein said mandrel means further includes mounting means in said forming section means for transporting said tip means between said most extended and closest positions.

6. The mandrel means of either claim 1, 2, 3 or 4, wherein said forming section means is fixed relative to said tip means; and wherein said mandrel means further includes mounting means in said forming section means for transporting said tip means between said most extended and closest positions;

said mounting means comprising shaft means connected with said tip means for moving said tip means along a path maintaining said portion of its peripheral surface as a said extension of said side seaming area.

7. The mandrel means of either claim 3 or 4, wherein said forming section means is fixed relative to said tip means; and wherein said mandrel means further includes mounting means in said forming section means for transporting said tip means between said most extended and closest positions;

said mounting means comprising shaft means connected with said tip means for moving said tip means along a path parallel with said side seaming area of said peripheral surface of said forming section means while maintaining said portion of said peripheral surface of said tip means as a said extension of said side seaming area.

8. A seaming means for sealing the side and bottom seams of a two-piece container comprising:

mandrel means for supporting the bottom blank and sidewall portions of a said container, said mandrel means including forming section means having a peripheral surface shaped to conform to the ultimate sidewall configuration of a said container and including a side seaming area extending longitudinally of said peripheral surface for supporting a lapped side seam of said container;

seam clamp means coextensive with said side seaming area and extending to a position beyond said forming section means coincident with a desired wet bottom line for said sidewall portion of said container for compressing the said lapped side seam against said side seaming area;

said mandrel means further including tip means mounted for selective movement toward and away from said forming section means and having a peripheral surface shaped to conform to the ultimate bottom blank and sidewall configuration of the bottom end of said container;

said tip means in its closest position to said forming section means having a portion of its peripheral surface coincident with and acting as an extension of said side seaming area for compressing a coextensive portion of said lapped side seam against said seam clamp means and in its most extended position having its peripheral surface symmetrically disposed with respect to said forming section means and conformally disposed with respect to the ultimate shape and location of the bottom most portion of said container to be fabricated on said mandrel means; and said tip means, in translation from said closest to said most extended position progressively compressing said lapped side seam against said seam clamp means from said forming section means to a wet bottom line.

9. The seaming means of claim 8, wherein said tip means further includes vacuum applying means for retaining a said bottom blank thereon.

10. The seaming means of claim 8, wherein said forming section means and said tip means are frustoconical in configuration and coaxially disposed in said most extended position of said tip means.

11. The seaming means of claim 10, wherein said tip means further includes vacuum applying means for retaining a bottom blank thereon.

12. The seaming means of either claim 8, 9, 10 or 11, wherein said forming section means is fixed relative to said tip means; and wherein said mandrel means further includes mounting means in said forming section means for transporting said tip means between said most extended and closest positions.

13. The seaming means of either claim 8, 9, 10 or 11, wherein said forming section means is fixed relative to said tip means; and wherein said mandrel means further includes mounting means in said forming section means for transporting said tip means between said most extended and closest positions;

said mounting means comprising shaft means connected with said tip means for moving said tip means along a path maintaining said portion of its peripheral surface as a said extension of said side seaming area.

14. The seaming means of either claim 10 or 11, wherein said forming section means is fixed relative to said tip means; and wherein said mandrel means further includes mounting means in said forming section means for transporting said tip means between said most extended and closest positions;

said mounting means comprising shaft means connected with said tip means for moving said tip means along a path parallel with said side seaming area of said peripheral surface of said forming section means while maintaining said portion of said peripheral surface of said tip means as a said extension of said side seaming area.

15. The seaming means of claim 8, which further includes bottom clamping means for engaging with said sidewall below said wet bottom line for supporting a formed bottom curl structure of said container for sealing; and wherein said tip means, in translation from said closest to said most extended position, interleaves a said bottom blank with said bottom curl structure;

said bottom clamping means acting further to compress said bottom curl structure and said bottom blank into sealed engagement.

16. The seaming means of claim 15, wherein said tip means further includes vacuum applying means for retaining a said bottom blank thereon.

17. The seaming means of claim 15, wherein said forming section means and said tip means are frustoconical in configuration and coaxially disposed in said most extended position of said tip means.

18. The seaming means of claim 17, wherein said tip means further includes vacuum applying means for retaining a bottom blank thereon.

19. The seaming means of either claim 15, 16, 17 or 18, wherein said forming section means is fixed relative to said tip means; and wherein said mandrel means further includes mounting means in said forming section means for transporting said tip means between said most extended and closest positions.

20. The seaming means of either claim 15, 16, 17 or 18, wherein said forming section means is fixed relative to said tip means; and wherein said mandrel means further includes mounting means in said forming section means for transporting said tip means between said most extended and closest positions;

said mounting means comprising shaft means connected with said tip means for moving said tip means along a path maintaining said portion of its peripheral surface as a said extension of said side seaming area.

21. The seaming means of either claim 17 or 18, wherein said forming section means is fixed relative to said tip means; and wherein said mandrel means further includes mounting means in said forming section means for transporting said tip means between said most extended and closest positions;

said mounting means comprising shaft means connected with said tip means for moving said tip means along a path parallel with said side seaming area of said peripheral surface of said forming section means while maintaining said portion of said peripheral surface of said tip means as a said extension of said side seaming area.

22. The seaming means of claim 9, wherein said sidewall and bottom blanks have thermoplastic surfaces thereon, which further includes hot air diffuser means selectively applying hot air in the area of said bottom curl when said tip means has positioned said bottom blank so as to preclude impingement of said hot air on or above said wet bottom line of said container.

23. The seaming means of claim 22, wherein said hot air diffuser means includes retractably mounted diffuser head means for selectively precluding the application of heated air to said bottom curl area.

24. The seaming means of either claim 15, 16, 17 or 18, wherein said sidewall and bottom blanks have thermoplastic surfaces thereon, which further includes hot air diffuser means selectively applying hot air in the area of said bottom curl when said tip means has positioned said bottom blank so as to preclude impingement of said hot air on or above said wet bottom line of said container.

25. The method of forming a two-piece container from a bottom blank and sidewall blank, on a two-piece forming mandrel having a retractable tip section and a main forming section, comprising the steps of:

providing a bottom blank on said retractable tip section of said two-piece forming mandrel;

wrapping a sidewall blank about said main forming section with side and bottom seam sealing areas defined thereon to provide a lapped side seam on said sidewall while maintaining said retractable tip section in its retractable position;

clamping said lapped side seam against said main forming section and the tip section to partially seal said lapped side seam over the combined longitudinal extent of said forming section and the retracted tip section wherein said tip section in its closest position to said main forming section has a portion of its peripheral surface coincident with and acting as an extension of a side seaming area of said main forming section;

forming a bottom curl on the lowermost extremity of said sidewall beneath a ultimate wet bottom line of a container to be formed to present said bottom seam area internally of said bottom curl;

extending said retractable tip section, in continuous juxtaposition with said lapped side seam to progressively seal the latter and said bottom blank with said bottom seam area in said bottom curl; and compressing said bottom seam area against said bottom blank to provide a sealed bottom seam in said container.

26. The method of claim 25, wherein said bottom blank is provided with a skirt portion; and
wherein said skirt portion is interleaved with said bottom curl to form said bottom seam.

27. The method of either claims 25 or 26, wherein said sidewall and bottom blanks have thermoplastic surfaces thereon and said seam areas are defined by heating said thermoplastic surfaces, including the further step of heating that portion of the side seam not juxtaposed with said forming mandrel prior to extending said retractable tip to progressively heat seal that portion of said side seam.

28. The method of either claim 25 or 26, wherein sidewall and bottom blanks have thermoplastic surfaces thereon and said seam areas are defined by heating said thermoplastic surfaces, including the further step of impinging a pattern of heated air against said bottom curl and said bottom blank up to a position immediately below said wet bottom line to heat said bottom seam area to sealing temperature while precluding heat damage to said thermoplastic surfaces at and above the said wet bottom line of said container.

29. The method of either claim 25 or 26, wherein said sidewall and bottom blanks have thermoplastic surfaces thereon and said seam areas are defined by heating said surfaces, including the further step of heating that portion of the side seam not juxtaposed with said forming mandrel prior to extending said retractable tip to progressively heat seal that portion of said side seam; and the further step of impinging a pattern of heated air against said bottom curl and said bottom blank up to a position immediately below said wet bottom line to heat said bottom seam area to sealing temperature while precluding heat damage to said thermoplastic surfaces at and above the said wet bottom line of said container.

* * * * *